United States Patent
Radcliff et al.

(10) Patent No.: US 10,107,527 B2
(45) Date of Patent: Oct. 23, 2018

(54) FIELD-ACTIVE DIRECT CONTACT REGENERATOR

(71) Applicant: Carrier Corporation, Jupiter, FL (US)

(72) Inventors: Thomas D. Radcliff, Vernon, CT (US); Joseph V. Mantese, Ellington, CT (US); Slade R. Culp, Coventry, CT (US); Subramanyaravi Annapragada, Shrewsbury, MA (US)

(73) Assignee: CARRIER CORPORATION, Jupiter, FL (US)

( * ) Notice: Subject to any disclaimer, the term of this patent is extended or adjusted under 35 U.S.C. 154(b) by 33 days.

(21) Appl. No.: 15/302,642

(22) PCT Filed: Apr. 9, 2014

(86) PCT No.: PCT/US2014/033493
§ 371 (c)(1),
(2) Date: Oct. 7, 2016

(87) PCT Pub. No.: WO2015/156794
PCT Pub. Date: Oct. 15, 2015

(65) Prior Publication Data
US 2017/0030611 A1    Feb. 2, 2017

(51) Int. Cl.
*F25B 21/00* (2006.01)
*F25B 9/14* (2006.01)
*F25B 25/00* (2006.01)

(52) U.S. Cl.
CPC ............. *F25B 9/145* (2013.01); *F25B 21/00* (2013.01); *F25B 25/00* (2013.01); *F25B 2309/1415* (2013.01); *F25B 2321/001* (2013.01)

(58) Field of Classification Search
CPC .......... F25B 21/00; F25B 21/02; F25B 9/145; F25B 25/00; F25B 9/14; F25B 13/00;
(Continued)

(56) References Cited

U.S. PATENT DOCUMENTS 5,644,184 A * 7/1997 Kucherov ............... F25B 21/00
310/306
6,479,007 B1 * 11/2002 Greenberg ......... B01D 67/0018
264/216
(Continued)

FOREIGN PATENT DOCUMENTS

JP      2013160460 A    8/2013
WO      199910695       3/1999
(Continued)

OTHER PUBLICATIONS

International Search Report for International Appln No. PCT/US2014/033493; filing date: Apr. 9, 2014; dated Jan. 21, 2015; 4 pages.
(Continued)

*Primary Examiner* — Melvin Jones
(74) *Attorney, Agent, or Firm* — Cantor Colburn LLP

(57) ABSTRACT

Embodiments are directed to a heat pump element comprising: a thin-film polymer or ceramic material within a range of 0.1 microns-100 microns thickness, and electrodes coupled to both sides of the thin-film material to form an electroded active thin-film material, wherein the thin-film material is separated by, and in intimate contact with, a heat transfer fluid in channels within a range of 10 microns-10 millimeters thickness, in which the fluid is capable of being translated back and forth through the element by an imposed pressure field.

20 Claims, 7 Drawing Sheets

(58) Field of Classification Search
CPC .............. F25B 1/00; F25B 2309/1415; F25B 2321/001; F25B 2321/0021; Y02B 30/66; H01L 35/30; B01D 69/02
USPC ........................................ 62/3.1, 3.3, 324.1
See application file for complete search history.

(56) References Cited

U.S. PATENT DOCUMENTS

| | | | |
|---|---|---|---|
| 6,877,325 | B1 | 4/2005 | Lawless |
| 8,544,256 | B2 | 10/2013 | Junod |
| 8,683,815 | B2 | 4/2014 | Muller et al. |
| 2002/0162338 | A1* | 11/2002 | Shimada ............. F25B 21/02 62/3.7 |
| 2007/0042667 | A1* | 2/2007 | Sung ................. H01J 1/304 445/51 |
| 2008/0203849 | A1* | 8/2008 | Hagg ................. F25B 21/00 310/306 |
| 2010/0175392 | A1 | 7/2010 | Malloy et al. |
| 2011/0116171 | A1* | 5/2011 | Kwon ................ G02B 3/14 359/666 |
| 2011/0116206 | A1* | 5/2011 | Kim .................. H01L 23/467 361/231 |
| 2012/0222427 | A1 | 9/2012 | Hassen |
| 2014/0035735 | A1* | 2/2014 | Zellers ............... G08B 6/00 340/407.2 |

FOREIGN PATENT DOCUMENTS

| | | |
|---|---|---|
| WO | 2011034594 A1 | 3/2011 |
| WO | 2012115514 A2 | 8/2012 |
| WO | 2013001061 A2 | 1/2013 |
| WO | 2014041621 A1 | 3/2014 |

OTHER PUBLICATIONS

Kevin Drost, "Enhancement of Heat and Mass Transfer in Mechanically Constrained Ultra Thin Films"; Oregon State University; published Jan. 1, 2005 (Abstract); 2 pages. [online] Retreived from URL: http://www.osti.gov/scitech/biblio/861948.

Written Opinion of the International Searching Authority for International Appln. No. PCT/US2014/033493; date of filing: Apr. 9, 2014; 5 pages.

ECN, "Thermoacoustic Systems," ECN Energy Research Centre of the Netherlands, 2007, pp. 1-2.

Kurt Engelbrecht, "A Numerical Model of an Active Magnetic Regenerator Refrigeration System," A Thesis Master of Science, University of Wisconsin-Madison, 2004, pp. 1-177.

M. Poses, et al., "Thermoacoustic Refrigeration for Ice Cream Sales," Acoustical Society of America Journal, 114, Sep. 2003, pp. 1-8.

PCT International Preliminary Report on Patentability; International Application No. PCT/US2014/033493; International Filing Date: Apr. 9, 2014; dated Oct. 12, 2016; pp. 1-6.

WikiBooks.org, [online]; [retrieved on Jan. 21, 2018]; retrieved from the Internet https://en.wikibooks.org/wiki/Engineering_Acoustics/Thermoacoustics WikiBooks, "Engineering Acoustics/Thermoacoustics," Wikibooks, Aug. 19, 2017, pp. 1-8.

Jizhou He et al., "Regenerative characteristics of electrocaloric Stirling or Ericsson refrigeration cycles", Energy Conversion & Management, vol. 43, 2002, 10 pages.

M. Ozbolt et al., "Electrocaloric vs. magnetocaloric energy conversion", SciVerse ScienceDirect, Elseviar, vol. 37, 2014, 13 pages.

Notification of Reasons for Rejection issued in JP Patent Application No. 2017-50542 dated May 29, 2018, 12 pages.

* cited by examiner

FIELD-ACTIVE DIRECT CONTACT REGENERATOR

CROSS REFERENCE TO RELATED APPLICATIONS

This application is a National Phase Application of Patent Application PCT/US2014/033493 filed on Apr. 9, 2014, the contents of which are incorporated herein by reference in their entirety.

BACKGROUND

Materials that exhibit adiabatic temperature change when subject to mechanical strain, magnetic fields, or electrical fields have been used to create heat pump cycles. A basic cycle is shown in FIG. 1. At state 1, a material is at steady temperature and is subject to a steady field applied directly to the material. An increase in the applied field strength increases material temperature at state 2. Heat is rejected to a hot ambient bringing the material temperature down near the hot ambient value in state 3. This is best accomplished through direct contact of the ambient air and the active material. Reduction of the field strength reduces material temperature at state 4. The cycle is then completed by absorbing heat from a cold ambient, again preferably through direct contact, causing the material temperature to rise back to the state 1 value. This cycle may approximate ideal Carnot, Brayton, or Ericsson cycles depending on the timing of field actuation in relation to heat rejection.

The adiabatic temperature lift available with known electrocaloric or magnetocaloric materials is typically lower than the lift required for most commercial heat pump applications such as environmental control. One well-known means of increasing temperature lift (at the expense of capacity) is temperature regeneration. Regeneration is used to develop a temperature gradient and thus multiply temperature lift in a regenerator that incorporates field-active material.

Regenerative heat exchangers are common in cycles that use fluid compression rather than field-active materials to provide heat pumping. For example, thermoacoustic coolers that apply a modified Stirling cycle are common practice. These units include one or more acoustic drivers, a resonant volume, a regenerator element and heat exchangers on either side of the element. The root of this technology is excitation of pressure and velocity fluctuations that compress and expand, as well as axially translate, the fluid within a regenerative heat exchanger. The fluid gives up heat to the regenerator matrix at one axial position when compressed and absorbs heat back at a different axial location when it is expanded. These heat exchanges create a temperature gradient shared by the regenerator matrix and the fluid within the regenerator. This gradient translates back and forth between hot and cold heat exchangers to pump heat in a manner similar to the field-activated regenerator case described above. The similarity is that the fluid within the regenerator is translated axially by some mechanical means. However, they differ in that in the field-active case the work for heat pumping comes entirely from the field imposed on the solid material of the regenerator and the fluid provides the heat capacity for regeneration, while in the thermoacoustic case the work for heat pumping comes from compression/expansion of the fluid within the regenerator and the solid material of the regenerator provides the heat capacity for regeneration. Also, in a thermoacoustic or other pressure-based cooling cycle, it is necessary to use a heat exchanger to separate the pressurized working fluid from the ambient air resulting in a significant loss in performance. Field-activated regenerators can be operated with the ambient air in direct contact with the active material.

The passive regenerator is known to benefit from several important performance characteristics. It must: 1) have adequate heat capacity in the solid media to store the energy to be regenerated; 2) allow passage of the working fluid without too much flow resistance; 3) enable heat transfer between the regenerator mass and working fluid; and 4) prevent heat conduction along the direction of the temperature gradient (and flow). Typical embodiments are cylindrical stacks created from layers of wire mesh or a duct filled with small metal spheres.

BRIEF SUMMARY

An embodiment is directed to a heat pump element comprising: a thin-film polymer or ceramic material within a range of 0.1 microns-100 microns thickness, and electrodes coupled to both sides of the thin-film material to form an electroded active thin-film material, wherein the thin-film material is separated by, and in intimate contact with, a heat transfer fluid in channels within a range of 10 microns-10 millimeters thickness, in which the fluid is capable of being translated back and forth through the element by an imposed pressure field.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
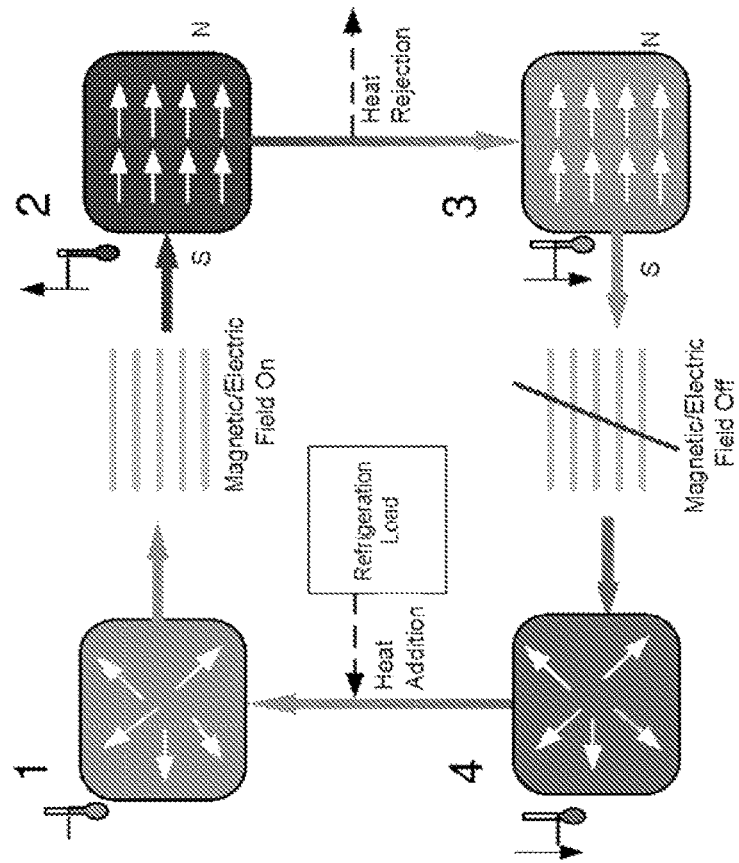
FIG. 1 is a diagram of a basic field-activated heat pump cycle in accordance with the prior art.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing a heat pump element. The heat pump element may include a thin-film polymer or ceramic material. A pair of electrodes may be intimately coupled to the thin-film materials. For example, a first of the electrodes may be coupled to a first side of the thin-film material and a second of the electrodes may be coupled to a second side of the thin-film material. The thin-film material may be separated by, and in intimate contact with, a heat transfer fluid in one or more channels. The heat transfer fluid may be the ambient air without intermediate heat exchangers. The fluid may be capable of being translated back and forth through the heat pump element by an imposed pressure field.

Embodiments of the disclosure are directed to a class of devices that exhibit characteristics required to best execute the function of an electric field-active regenerator using electrocaloric materials that change temperature when an electric field is applied.

Figure 2:
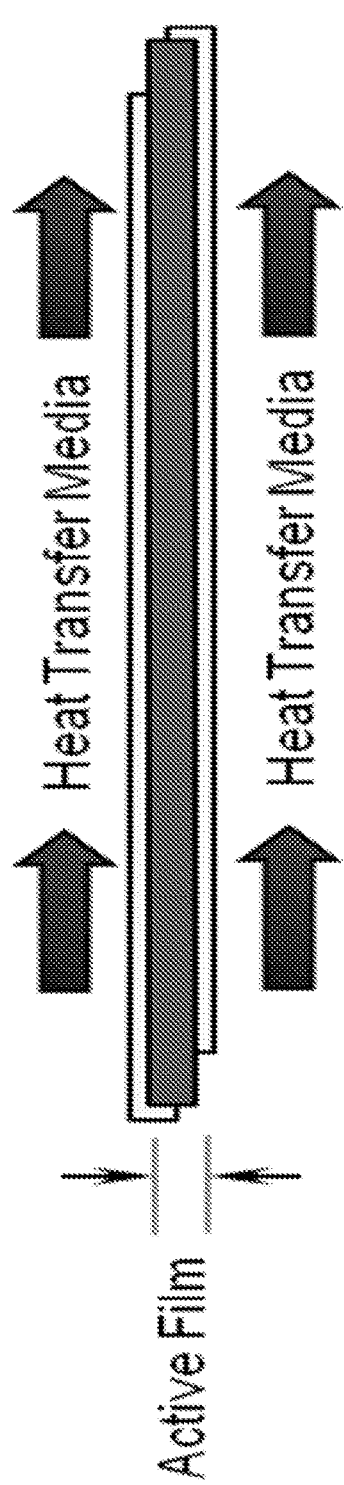
FIG. 2 is a diagram of a single layer device for a field-active regenerator that enables intimate field application and direct contact heat exchange.

There are two classes of materials known to possess useful electrocaloric properties: ferroelectric ceramics and polyvinylidene fluoride (PVDF) polymers. In some application environments, to develop adequate entropy and adiabatic temperature changes in known examples of either material, an electric field greater than 1MV/cm must be applied to the materials without dielectric breakdown. This requirement tends to favor very thin films, on the order of one micron, to minimize defects that reduce breakdown strength. These films must also be metalized on both sides to apply the field and the electrodes must be positioned so as to avoid arcing across the surface. Such films must be in thermal contact with a heat transfer fluid that can be translated through a regenerator structure and must respond rapidly to thermal dynamics. In some embodiments, a basic film may have a thickness on the order of 0.1-100 microns, or any range in between (e.g., 0.3-3 microns). Such a thickness may 1) ensure an adequate mass of material in each film needed to create heat pumping capacity at reasonable device volumes, 2) maintain the applied voltage needed to create a field of 1 MV/cm at a manageable level, and 3) ensure rapid thermal transfer between film and heat transfer fluid to allow high fluid translation frequency and thus increase capacity. A fundamental structure for a field-active regenerator is a single-layer device as shown in FIG. 2. Such a structure allows ambient air to serve as the heat transfer media in direct contact with the active films which obviates thermal losses associated with the intermediate heat exchangers common in the state of the art.

The basic, single-layer structure of FIG. 2 can be improved or enhanced in connection with a regenerator device. For example, a given application associated with environmental cooling may require tens to hundreds of grams per kW so many such layers may be needed. Next, some structure may be needed to support these very thin films. This structure may represent a parasitic thermal loss to the active material in the regenerator so the mass of structure as well as its thermal contact with the active material may need to be limited.

In some instances, performance may be maximized using a multilayer active material. Modeling may indicate that best performance may be achieved by balancing several factors or constraints, such as one or more of: (1) the total mass of active material, (2) the ratio of stored energy of the film to the stored energy of the associated fluid, (3) the heat transfer coefficient from material to fluid, (4) the losses related to moving fluid through the flow passages, (5) the parasitic stored heat of the electrodes, (6) the joule heating in the electrode, (7) the frequency at which the material is energized, and (8) the value or power associated with the voltage or field that is applied.

Figure 3A:
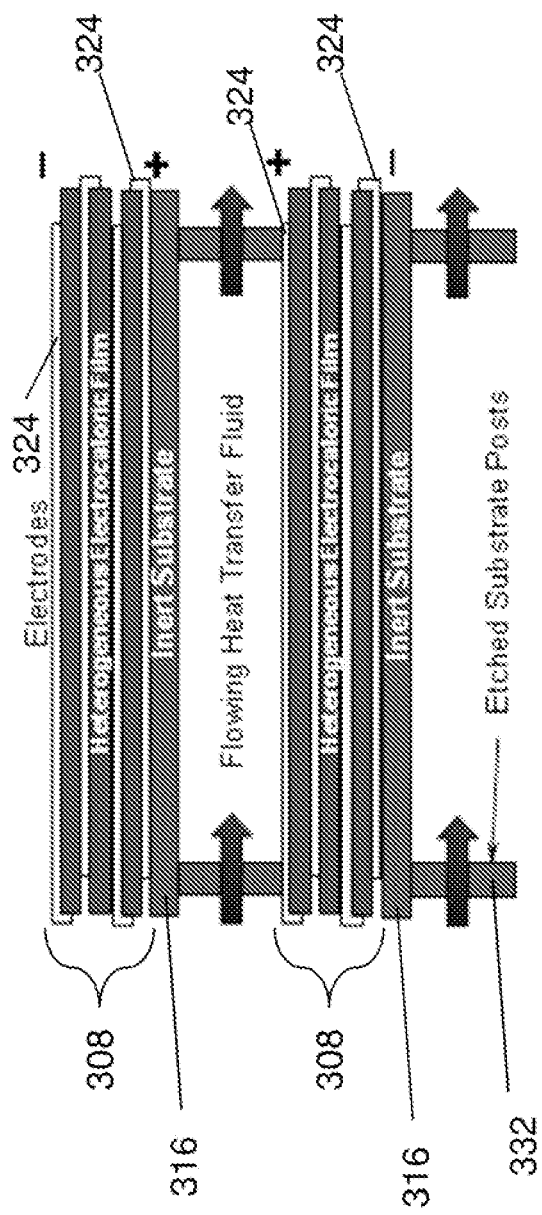
FIGS. 3A-3B are diagrams of a multi-layer device for a field-active regenerator.
Figure 3B:
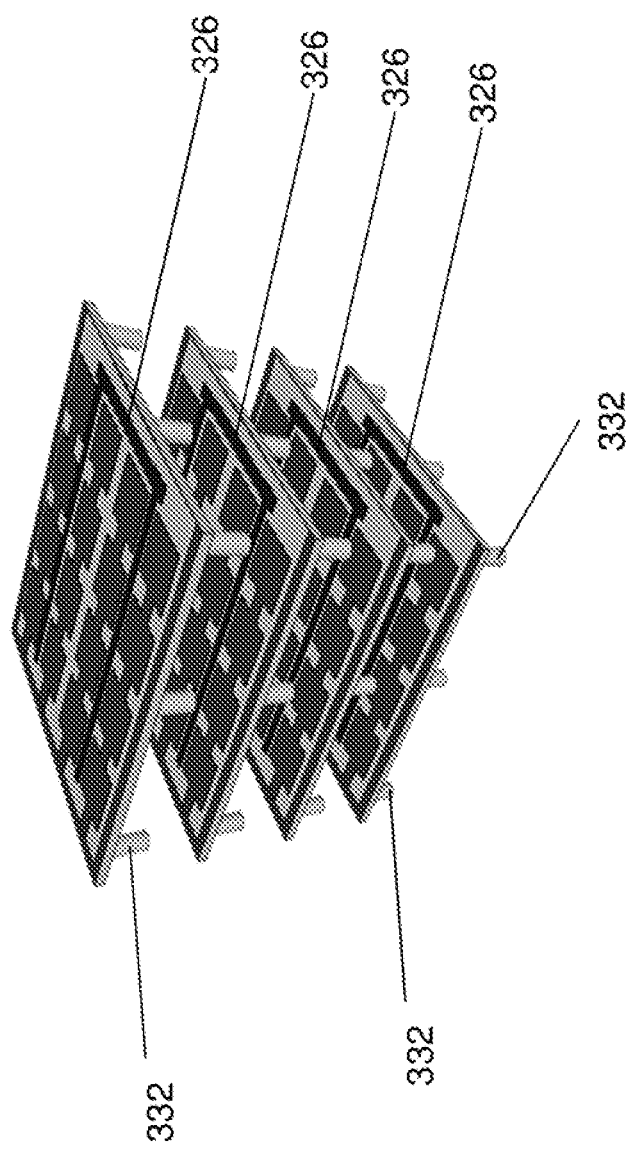

A balancing of a combination involving some or all of the above-noted constraints may dictate a film thicker than, e.g., 3 microns. To meet this need while still limiting applied voltage, a multilayer construction can be applied, stacking multiple layers of the basic structure of FIG. 2 between heat transfer passages as shown in FIGS. 3A-3B (collectively referred to herein as FIG. 3).

As shown in FIG. 3, single or multilayer films 308 are supported by inert substrates 316 that also serve to establish heat transfer fluid channels. The polarity (+/−) of the electrodes 324 shown may be arranged such that there is no electric potential across the fluid channels or substrates 316. Also shown are contact pads or vias 326 that may be used to establish access to the electrodes 324.

To minimize the substrate 316 parasitic thermal loss, the substrate 316 design may provide adequate support but also minimize transient heat transfer between the film 308 and the substrate 316. This may be accomplished by minimizing not just the volume or heat capacity of the substrate 316 but also minimizing the equivalent Biot number. Such a substrate 316 may be a thin frame around the edges of the films 308. Additional thin braces can be added across the frame if more support of the film 308 is required, resulting in a "rail film" type of substrate. The films 308 and substrates 316 may be supported or separated from one another using one or more molded or etched substrate posts 332 or similar mechanisms.

Conversely, parasitic losses may be minimized by using a field-active material for the substrate 316 such that this active substrate is energized along with the active films 308. In this case, the electrodes 324 would be arranged to apply the full electric potential to the substrate as well as to the active films.

The design of FIG. 3 may satisfy active regenerator requirements and passive regenerator requirements described above, with the possible exception of preventing heat conduction along a direction of a temperature gradient. In general, the materials used may have low conductivity compared to the standard regenerator materials but still the regenerator could be built of many axial segments of the basic module described above in connection with FIGS. 2-3 with a narrow air gap in between, all encased in a shell to duct heat transfer fluid. This type of design also enables the sequential activation of the electrodes associated with electrocaloric material in each module. This allows flexibility in synchronization of the field and the fluid flow as needed to optimize module performance at different conditions. In addition, the best formulation of electrocaloric material may be temperature dependent such that different formulations are desired along the temperature gradient. Different modules can each be made using material with an optimal Curie temperature, or material having a continuous gradient of $T_{Curie}$ may be applied in the modules.

Figure 4:
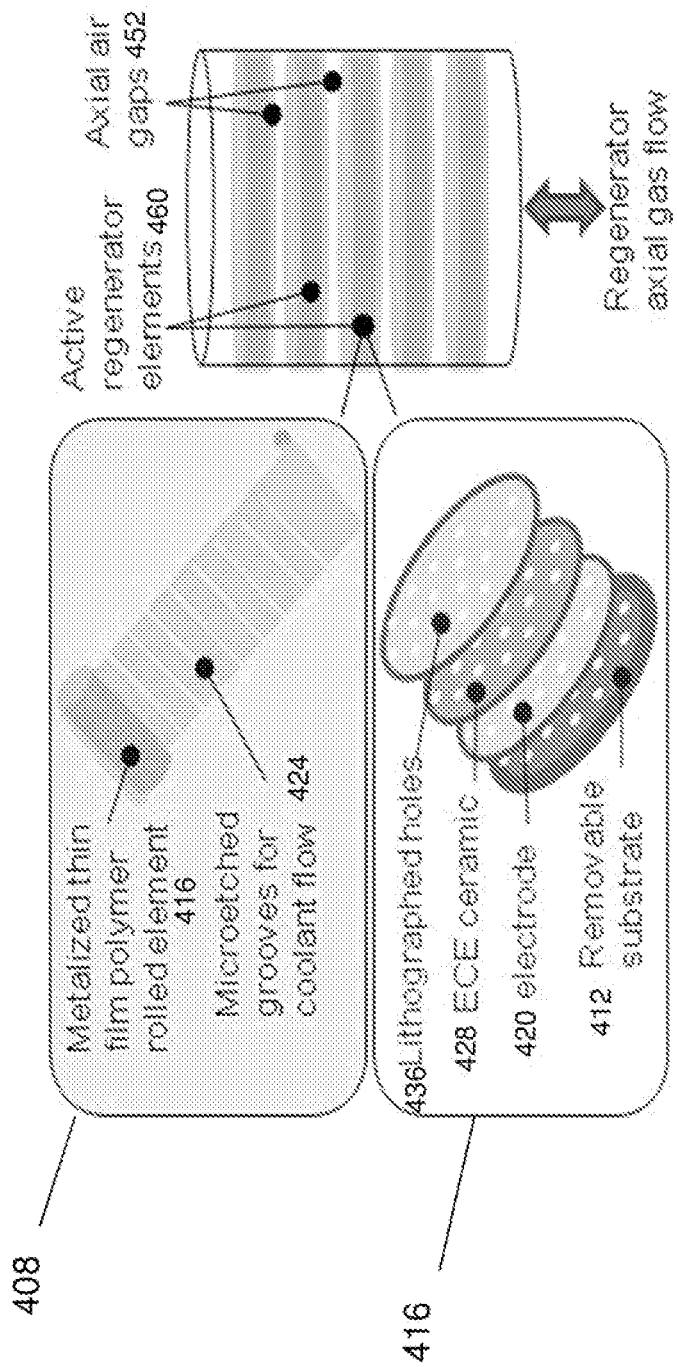
FIG. 4 illustrates variations on the embodiments of FIG. 2 and FIGS. 3A-3B.

In some embodiments, variations on the basic module described above may be used. FIG. 4 illustrates two such variations or embodiments to meet the requirements in two different material classes.

In a first embodiment 408, a thin polymer film or multilayer 416 is created as described above. Grooves or bumps 424 may be created on the surface by rolling, etching, or similar processes. These features may be from 10% of the film thickness to as much as several times the thickness in the case of raised bumps 424. The film 416 may be metalized by evaporation or similar processes. The film 416 may then be rolled perpendicularly to the feature direction to create a circular cylinder with passages along the axis created by the grooves or bumps 424. Wires may be attached to electrodes at the end of the material wrap to allow the material to be energized or patterned electrodes may be deposited to match the half-circumference of each layer 416 and then connected in parallel on each edge of the wrap.

In a second embodiment 416, thin ceramic films are layered on a substrate 412. The layers include dividing electrodes 420, resulting in a structure of: substrate 412, electrode 420, electrocaloric effect (ECE) ceramic 428, electrode 420. ECE ceramic 428, etc. These layers may be formed by physical vapor deposition (PVD), chemical vapor deposition (CVD), plasma spray, or similar known processes. The alternating electrode layers 420 may be displaced to one side to allow, e.g., all odd numbered electrode layers 420 to be easily connected in parallel to one voltage while the even number electrode layers 420 are connected to another voltage source.

As each layer is formed gas passages 452 may be created. FIG. 4 shows the example of using microlithography or similar techniques to leave or etch holes 436 in each layer. Many layers may be built up to create one or more regenerator elements 460, the substrate may be etched off, and many axial gas passages 452 may be left through the material perpendicular to the electrode/material layers. In an embodiment, grooves may be etched into the surface of each layer such that a gap remains parallel to the layer as the next layer is deposited. In this case, the gas passages may be parallel to the electrode/material layers.

The regenerator elements 460 in FIG. 4 are shown as being included in a cylindrical shaped structure. In some embodiments, other shapes may be used (e.g., hexagonal, elliptical, etc.).

As before, the regenerator structures 460 may need to prevent heat conduction along the direction of the temperature gradient, and the best formulation of ECE material may be temperature dependent such that different formulations are desired along the temperature gradient. The structures described above might not directly support such requirements. A modular regenerator structure may be provided where each element as described above is created with the best formulation and then the layers are stacked with axial gas gaps on the order of 0.1 to 5 millimeters. Each layer may have a contiguous formulation appropriate to the local temperature, and the gaps may prevent axial conduction.

Figure 5:
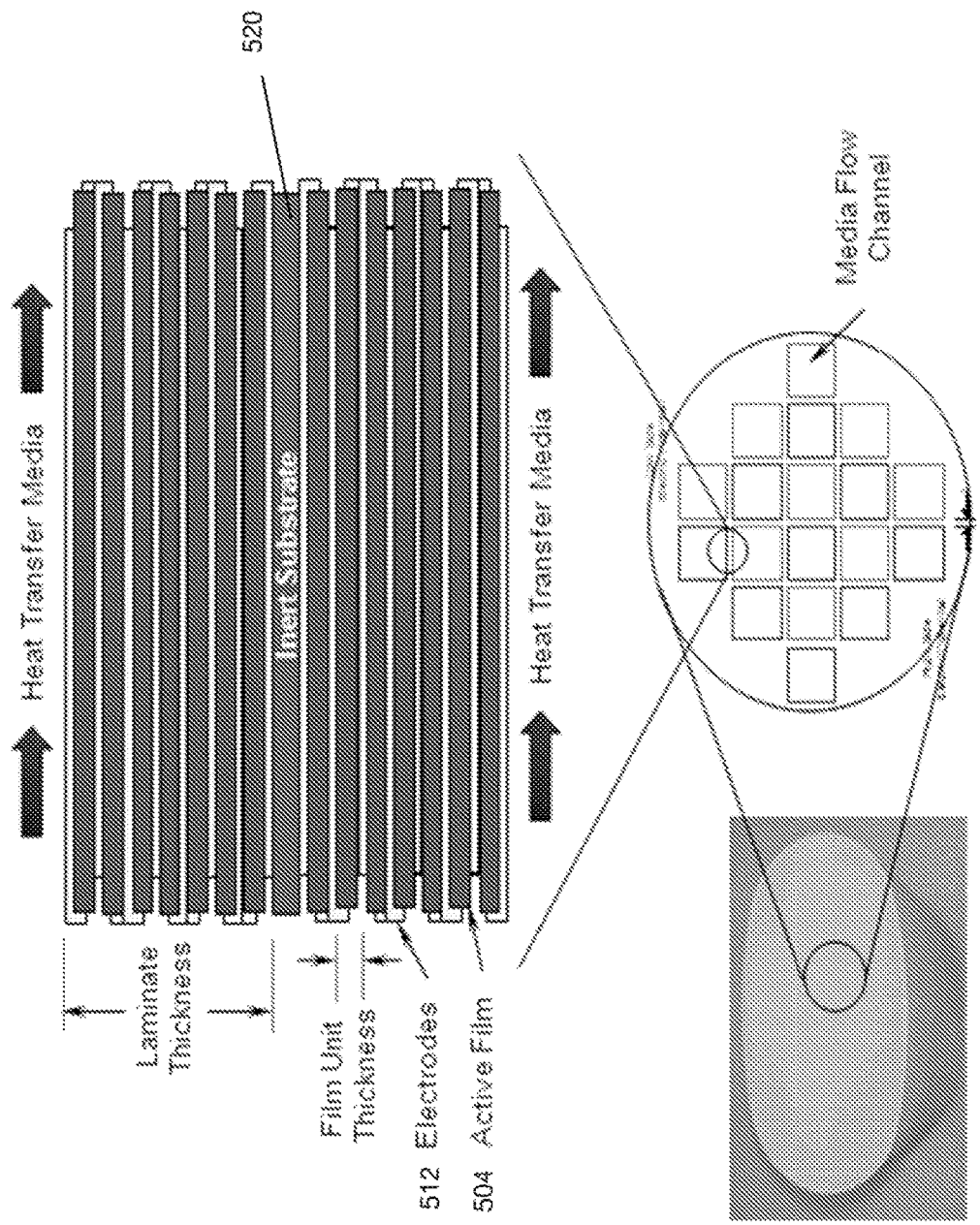
FIG. 5 illustrates a structure comprising a plating of a lattice structure of ceramic and electrode material on a conventional substrate.

Another embodiment, as shown in FIG. 5, would involve a plating of a lattice structure of ECE ceramic 504 and electrode 512 materials on a conventional substrate 520 and exposing the open surface to a heat transfer medium. A conventional structure such as the honeycomb structure applied to automotive exhaust catalysts may serve as the substrate 520. The substrate 520 may then be coated by consecutive layers of electrode 512 and ECE materials 504 in the desired thickness using wet or vacuum techniques. The electrodes 512 may have an alternating structure such that alternate electrodes could be accessed electrically from each end of the structure.

Figure 6:
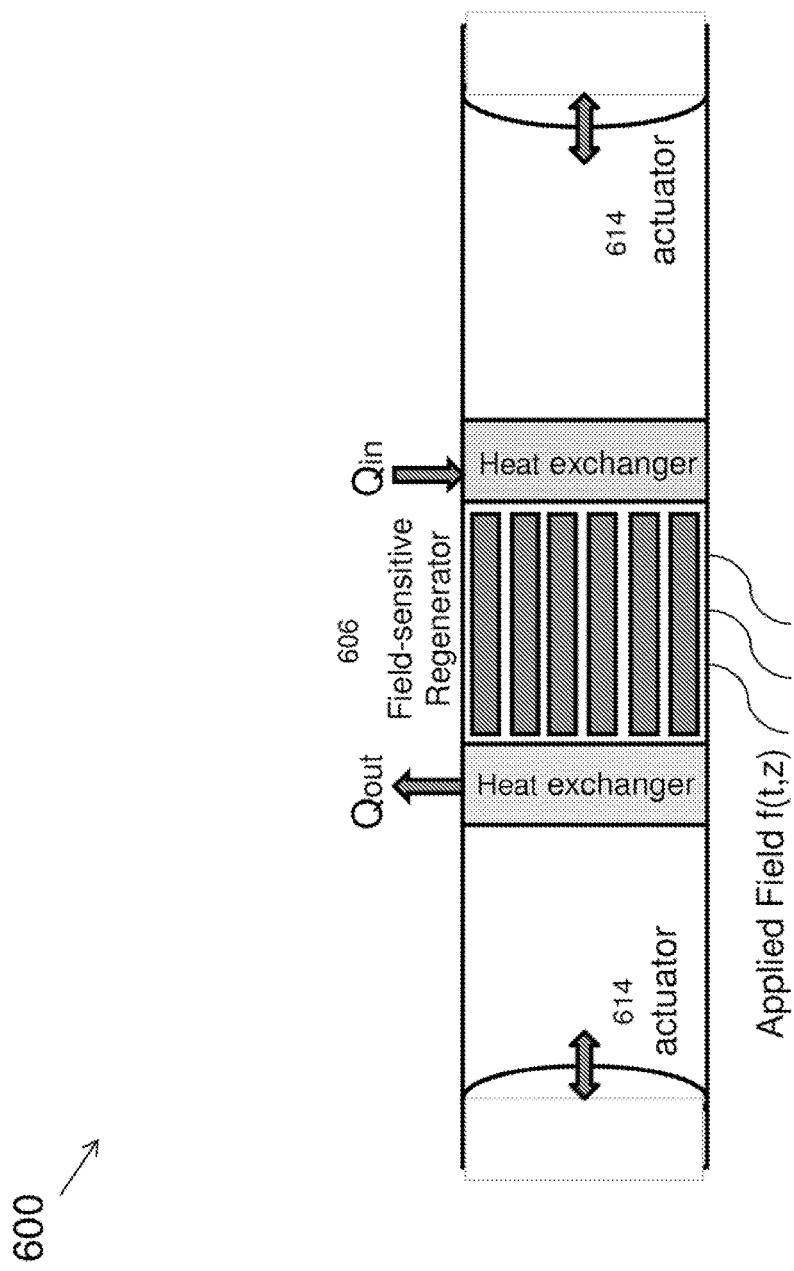
FIG. 6 illustrates a combined cycle system which simultaneously incorporates active and passive regenerator functions.

The embodiment described above may take advantage of the characteristics of the active and passive regenerators in the two cycles described above to create a combined cycle system. Referring to FIG. 6, this system may be embodied by a system 600 that includes a regenerative heat exchanger made of field active material 606 and may include linear actuators or acoustic drivers 614 synchronized to produce fluid compression as well as fluid translation in the active regenerative heat exchanger. This concept will not support the use of ambient air as a direct contact heat transfer media and so will require intermediate heat exchangers.

To illustrate the range of concepts, an initial construction may be provided using an active electrocaloric material regenerator including many thin films of electrocaloric polymer or ceramic with electrodes and interspersed heat transfer fluid channels, hot and cold heat exchangers, and simple linear actuator-driven translational flow of working fluid that may be gas or liquid, pressurized or not.

Application of a field (e.g., an electric field, a radiation/ light field, a magnetic field, strain, etc.) through intimate contact to the field-active regenerator element 606 may increase the material temperature. The fluid may serve as the regenerator medium, warming up through heat exchange with the now warm solid material. If the actuators 614 now simultaneously move from right to left, hot fluid in the regenerator core 606 may move into the hot heat exchanger, rejecting heat while cooler fluid from the cold heat exchanger may move into the regenerator 606 and locally cool (regenerate) the regenerator material. Releasing the field to cool the material and moving the fluid from left to right may complete the cycle. Note that, in the case of pure fluid translation with negligible pressure change, this is the same process described above as a simple field-active regenerative cycle. The performance of the system 600 may depend on timing and synchronization of the applied field and flow, and that such timing may change with thermal properties of the material, the load, and the temperature lift desired, so careful control of this process may be needed to achieve satisfactory performance.

Considering a combined cycle, the field may be energized and the material 606 may warm up. Again, heat may transfer into the fluid for regeneration. Now, rather than simply translate the flow to reject heat, the actuators 614 may be operated such that the fluid is first pressurized and then translated, or even pressurized and depressurized several times during a single translation. The compression may heat the fluid further, and heat may now transfer into the solid regenerator material 606 for regeneration of the fluid. Now the translation can be completed as before and the cold side of the cycle executed. The temperature lift and capacity of both field-actuated and compression processes may be superimposed in the same basic volume, resulting in less regenerative passes to increase lift and higher power density. This process may require even more precise temporal control of the fields and actuators 614 to control the superposition of pressure, velocity, and field gradients in time and space to achieve the highest overall system efficiency given specific temperature lift and capacity requirements.

Finally, in the case of the combined cycle described above, it might not be necessary that the entire regenerator be made of active material. It may be advantageous to disperse active material among other inactive traditional regenerator materials to properly balance the heat moved by the thermoacoustic compression process and the electrocaloric process. This may be done only if the inactive material is not in direct thermal contact with the active material. A structure may have field-active elements such as electrocaloric polymer films and inactive elements such as wire screen stacks alternately stacked along the flow direction with fluid gaps separating each material.

An embodiment is directed to a fluid-filled system containing a porous thin-film element made of field-sensitive material, heat transfer fluid channels, two or more heat exchangers, one or more actuators, one or more pressure, temperature, or velocity sensors, and one or more devices configured to control the actuators and apply a field to the regenerators in a particular sequence that may be predetermined or developed in response to, or based on, the sensor signals. Further, the actuators may be made of piezoelectric materials to create a completely solid state machine.

High fidelity modeling indicates that an electrocaloric heat pump in direct contact with ambient air may be provided with sufficient performance to displace existing vapor compression heating, ventilation, and air-conditioning (HVAC) devices with solid-state electrocaloric heat pumps that provide similar or better performance, lower cost, lower noise, and contain no environmentally harmful refrigerants or any releasable chemicals.

Embodiments of the disclosure may use an electrocaloric material in a regenerative heat exchanger in intimate contact with a flowing heat transfer fluid.

In some embodiments the flowing heat transfer fluid may be ambient air in direct thermal contact with the electrocaloric heat-pumping element.

In some embodiments, specific requirements may be defined for film supporting and separating substrates and associated electrode polarity to maximize heat transfer area and minimize parasitic losses.

In some embodiments, models may be used to identify the best range of film thickness for performance in HVAC conditions.

In some embodiments, a specific phase relationship between fluid motion and material activation may be defined that is actively controlled as capacity and lift change.

In some embodiments, actuation of heat transfer fluid motion to create compression/translation/expansion in a defined and controlled phase relationship with activation of electrocaloric material to multiply overall temperature lift may be provided.

An embodiment may be directed to a thin-film electrocaloric heat pump element comprising a thin-film polymer or ceramic material such as polyvinylidene fluoride (PVDF), liquid crystal polymers (LCPs) or barium strontium titanate (BST) of 0.1 microns-100 microns thickness (or any range in between), with reduced defects for high electric field capability and electrodes on both sides, separated by and in intimate contact with a heat transfer fluid in channels 10 microns-10 millimeters in thickness (or any range in between), in which the fluid can be translated back and forth through the element by an imposed pressure field.

An embodiment may be directed to an element similar to that described above in which the thin films are replaced by multilayer materials consisting of electrode-film-electrode-film . . . electrode. The number of layers may be from 2-20 permitting more ECE mass per unit volume without increasing applied voltage above 300V.

An embodiment may be directed to an element similar to one or more elements described above, in which a substrate supports the films to prevent fatigue. This substrate may be optimized to provide minimal necessary support with the lowest possible Biot number.

An embodiment may be directed to an element similar to one or more elements described above, in which the substrate includes extensions to separate the films creating channels for heat transfer fluid flow, allowing a stack of substrate-film-substrate-film- . . . substrate. Films may be arranged such that the electrodes facing the substrate-separator would be energized with the same polarity preventing arcing across the substrate or fluid.

An embodiment may be directed to an element similar to one or more elements described above, in which the heat transfer fluid is translated back and forth while the active material is energized and de-energized to create a temperature gradient in the fluid and increase temperature lift.

An embodiment may be directed to an element similar to one or more elements described above, in which the activation of the material is synchronized to the oscillation of the fluid flow with a phase relationship that is a function of the relative capacity and temperature lift required of the device to provide the highest ratio of heat pump capacity/input power.

An embodiment may be directed to an element similar to one or more elements described above, in which the material-electrode-fluid-substrate layers are segmented in the fluid flow direction and separated by gaps filled with fluid, reducing heat conduction in the flow direction.

An embodiment may be directed to an element similar to one or more elements described above, in which the Curie temperature of the material is graded continuously or segment-to-segment such that the material Curie temperature in each segment is closer to the expected operating temperature of the segment at the element design condition.

An embodiment may be directed to an element similar to one or more elements described above, in which the active material film contains machined lengthwise grooves or cross-drilled holes to create channels for heat transfer fluid allowing for intimate contact of the fluid and the material.

An embodiment may be directed to an element similar to one or more elements described above, created by solution or vacuum deposition of electrocaloric ceramic or polymer and electrodes on a substrate that already contains heat transfer fluid channels such as a ceramic honeycomb structure.

An embodiment may be directed to an element similar to one or more elements described above, in which the heat transfer fluid is at least partially gas or vapor and in which the actuation of fluid movement creates a sequence of: compression, translation, expansion, and translation synchronized in a controlled phase relationship with the energizing and de-energizing the ECE material, creating a combined cycle that adds the temperature lift of both EC effect and compression and requires less regeneration to produce a required temperature lift.

An embodiment may be directed to an element similar to one or more elements described above, operating in such a combined cycle in which non-active material is added to the electrocaloric thin-film material or substrate for the purpose of achieving the best balance between EC effect and compression effects.

An embodiment may be directed to a heat pump element, wherein a heat transfer fluid is ambient air in direct thermal contact with electroded active thin-film material. The electroded active thin-film material may be formed by electrodes coupled to both sides of a thin-film material. In some embodiments, the ambient air is dehumidified using overcooling or desiccant techniques to prevent condensation on the active film.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A heat pump element comprising:
   a thin-film polymer or ceramic material within a range of 0.1 microns-100 microns thickness; and
   electrodes coupled to both sides of the thin-film material to form an electroded active thin-film material,
   wherein the electroded active thin-film material is separated by, and in intimate contact with, a heat transfer fluid in channels within a range of 10 microns-10 millimeters thickness, in which the fluid is capable of being translated back and forth through the element by an imposed pressure field.

2. The heat pump element of claim 1, wherein the heat transfer fluid is ambient air in direct thermal contact with the electroded active thin-film material.

3. The heat pump element of claim 2, wherein the ambient air is dehumidified using overcooling or desiccant techniques to prevent condensation on the active thin-film material.

4. The heat pump element of claim 1, wherein the thin-film material is made in some part of at least one of polyvinylidene fluoride (PVDF), a liquid crystal polymer (LCP), and barium strontium titanate (BST).

5. The heat pump element of claim 1, wherein the thin-film material and electrodes are included as part of a multilayer material of thin-film materials and electrodes.

6. The heat pump element of claim 5, wherein the multilayer material comprises anywhere from 1 to 10 layers, inclusive.

7. The heat pump element of claim 5, wherein the multilayer material further includes at least one substrate configured to support the thin-film materials to prevent fatigue, wherein the at least one substrate is optimized to provide minimal necessary support with a lowest possible Biot number.

8. The heat pump element of claim 7, wherein the at least one substrate comprises a plurality of substrates, and wherein the plurality of substrates comprises extensions to separate the thin-film materials to create channels for heat transfer fluid now.

9. The heat pump element of claim 8, wherein the thin-film materials are arranged such that electrodes facing a substrate-separator are energized with the same polarity to prevent arcing across the substrate or fluid.

10. The heat pump element of claim 7, wherein at least one substrate comprises field-active material that is configured to be energized by the electrodes, and wherein the electrodes are configured to energize an active film in order to generate capacity to offset a parasitic effect of the at least one substrate.

11. The heat pump element of claim 1, wherein the thin-film material comprises single layers and substrates associated with the single layers stacked together.

12. The heat pump element of claim 1, wherein the heat pump element is configured to translate the heat transfer fluid back and forth while the thin-film material is energized and de-energized to create a temperature gradient in the fluid and increase temperature lift.

13. The heat pump element of claim 12, wherein the heat pump element is configured to synchronize an activation of the thin-film material to an oscillation of the fluid flow with a phase relationship that is a function of a relative capacity and temperature lift required of the heat pump element to provide a maximum ratio of heat pump capacity to input power.

14. The heat pump element of claim 1, wherein the thin-film material and electrodes are layers that are coupled to a fluid layer and a substrate layer, and wherein the thin-film material, electrode, and substrate layers are segmented in a fluid flow direction and separated by gaps filled with fluid to reduce heat conduction in the fluid flow direction.

15. The heat pump element of claim 1, wherein the Curie temperature of the thin-film material is grade continuously or segment-to-segment such that the material Curie temperature in each segment is closer to an expected operating temperature of the segment at the element design condition.

16. The heat pump element of claim 1, wherein the thin-film material comprises machined lengthwise grooves or cross-drilled holes to create channels for heat transfer fluid to provide for the intimate contact of the fluid and the thin-film material.

17. The heat pump element of claim 1, wherein the heat pump element is created by solution or vacuum deposition of electrocaloric ceramic or polymer and electrodes on a substrate, the substrate comprising heat transfer fluid channels.

18. The heat pump element of claim 17, wherein the heat transfer fluid channels comprise a ceramic honeycomb structure.

19. The heat pump element of claim 1, wherein the heat transfer fluid is at least partially gas or vapor, and wherein an actuation of fluid movement comprises a sequence of: compression, translation, expansion, and translation synchronized in a controlled phase relationship with an energizing and de-energizing of the thin-film material to create a combined cycle that adds the temperature lift of both electrocaloric effect (ECE) and compression.

20. The heat pump element of claim 19, wherein non-active material is coupled to the thin-film material or to a substrate to provide a balance between ECE and compression.

* * * * *